United States Patent
Xu et al.

(10) Patent No.: US 6,972,826 B1
(45) Date of Patent: Dec. 6, 2005

(54) LIQUID CRYSTAL BASED OPTICAL SIGNAL PROCESSING

(75) Inventors: Ming Xu, Dallas, TX (US);
Chongchang Mao, Plano, TX (US)

(73) Assignee: EC-Optics Technology Inc., (TW)

(*) Notice: Subject to any disclaimer, the term of this patent is extended or adjusted under 35 U.S.C. 154(b) by 372 days.

(21) Appl. No.: 10/098,703

(22) Filed: Mar. 14, 2002

Related U.S. Application Data (60) Provisional application No. 60/276,842, filed on Mar. 16, 2001.

(51) Int. Cl.[7] .............................................. G02F 1/13
(52) U.S. Cl. .................................................... 349/196
(58) Field of Search ............................... 349/196, 201, 349/202, 186

(56) References Cited

U.S. PATENT DOCUMENTS

| | | | | |
|---|---|---|---|---|
| 4,410,238 A | | 10/1983 | Hanson | 350/347 |
| 5,313,321 A | * | 5/1994 | Yamamoto et al. | 349/27 |
| 5,532,851 A | * | 7/1996 | Usami | 349/117 |
| 5,963,291 A | | 10/1999 | Wu et al. | 349/196 |
| 6,111,633 A | * | 8/2000 | Albert et al. | 349/196 |

* cited by examiner

Primary Examiner—Toan Ton
(74) Attorney, Agent, or Firm—Baker Botts L.L.P.

(57) ABSTRACT

An optical processing device includes a polarization modulator operable to change a polarization state of an input optical signal based at least in part on a control voltage applied to a liquid crystal material associated with the polarization modulator. The control voltage is based at least in part on a temperature of the liquid crystal material.

11 Claims, 6 Drawing Sheets

LIQUID CRYSTAL BASED OPTICAL SIGNAL PROCESSING

CROSS REFERENCE TO RELATED APPLICATIONS

This application claims the benefit of U.S. Provisional Application Ser. No. 60/276,842, filed Mar. 16, 2001.

TECHNICAL FIELD OF THE INVENTION

The present invention relates to the field of communication systems, and more particularly, to liquid crystal based optical processing devices.

BACKGROUND

In various optical signal processing applications, it becomes desirable to maintain a selected level of optical attenuation. For example, in variable optical attenuation and in optical switching, it may be desirable to ensure that the intensity of an output optical signal remains within a specified range compared to a reference standard or signal.

One approach to providing control over the attenuation of an optical signal is to measure the intensity of the output signal and compare that intensity to a reference optical signal. This comparison facilitates generation of a control signal operable to adjust the operation of a switching device to vary the intensity of the output signal. This approach, however, generally entails tapping into the optical signal to facilitate comparison of that signal with the reference level. In some cases, this can lead to additional design complexity and cost, and loss in the optical signal.

OVERVIEW OF THE EXAMPLE EMBODIMENTS

The present invention recognizes a need for a method and apparatus operable to facilitate variable attenuation and/or optical switching using liquid crystal devices that reduces or eliminates the need for tapping into the optical signal being processed. In another aspect of the invention, a novel optical signal processing device for use in a bandwidth between approximately 1310 and 1610 nanometers is realized.

In accordance with the present invention, a system and method for providing optical signal processing are provided that substantially reduce or eliminate at least some of the shortcomings associated with prior approaches.

In one embodiment, an optical processing device includes a polarization modulator operable to change a polarization state of an input optical signal based at least in part on a control voltage applied to a liquid crystal material associated with the polarization modulator. The control voltage is based at least in part on a temperature of the liquid crystal material.

In another embodiment, a method of processing an optical signal using an optical processing device comprises receiving a feedback signal indicating a temperature of a liquid crystal material associated with the optical processing device. The method further comprises determining a control signal based at least in part on the feedback signal. The method concludes by adjusting a polarization state of an input optical signal using the optical processing device in response to the control signal.

In still another embodiment, an optical processing device for use at wavelengths between approximately 1310 and 1610 nanometers comprises an optical switching element. The optical switching element comprises a liquid crystal material with a birefringence of 0.21 or less. The liquid crystal material further comprises a phase range of at least 120 degrees Celsius. In this embodiment, the phase range includes at least a temperature range of −15 degrees Celsius to 80 degrees Celsius. In a particular embodiment, the device further comprises a controller operable to determine the control voltage applied to the liquid crystal material based at least in part on the temperature of the liquid crystal material. In another particular embodiment, the device is capable of switching at speeds of at least once every 50 milliseconds and shows better temperature insensitivity than conventional liquid crystal materials, such as the material known as E-44.

Depending on the specific features implemented, particular embodiments may exhibit some, none, or all of the following technical advantages. For example, some embodiments facilitate control of optical signal modulation without requiring comparison of the output signal to a reference signal. This embodiment reduces or eliminates the need to tap into the optical signal for comparison and control purposes.

Another embodiment provides a liquid crystal based optical signal processing device that maintains acceptable switching speeds, while exhibiting good temperature insensitivity. This embodiment provides high granularity of control of the intensity of the optical signal, regardless of temperature fluctuations within the operating range of the device.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE EXAMPLE EMBODIMENTS

Figure 1:
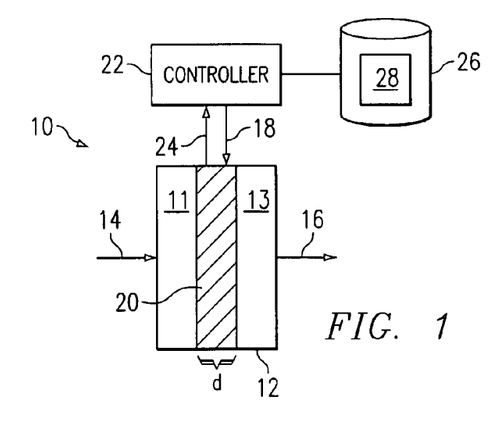
FIG. 1 is a block diagram of an exemplary embodiment of a temperature feedback controlled liquid crystal switching device constructed according to the teachings of the present invention.

One aspect of some embodiments of the present invention provides a novel feedback mechanism for controlling the operation of a liquid crystal based optical switching element, such as a polarization modulator, using the temperature of the liquid crystal material to determine a control signal applied to the device. FIG. 1 is a block diagram of an exemplary embodiment of a temperature feedback controlled liquid crystal switching device 10.

Device 10 shown in FIG. 1 includes a liquid crystal based modulator 12 operable to receive an input signal 14, to effect a change in the characteristics of that signal, and to output a signal 16 that may or may not be modified compared to input signal 14. Modulator 12 could comprise any device operable to change a characteristic of the input optical signal based at least in part on a control signal 18 applied to a liquid crystal material 20. Modulator 12 may comprise, for example, a polarization modulator, such as a liquid crystal cell, operable to change the polarization of input signal 14. As a particular example, liquid crystal polarization modulator 12 may comprise a polarization rotator operable to rotate the polarization of the input beam 14 by a particular amount depending on control voltage 18. In this embodiment, the liquid crystal cell has a cell gap distance, d, which is at least substantially filled by liquid crystal material 20.

In this embodiment, modulator 12 also includes at least a first assembly 11 and a second assembly 13. In various embodiments, each assembly 11, 13 can comprise an electrode layer operable to receive a control voltage 18 from controller 22 and to apply an electric field to the liquid crystal material, and a substantially transparent substrate. In particular embodiments, each electrode layer may comprise a substantially transparent material, such as, for example, indium tin oxide. The substantially transparent substrate may comprise, for example, glass. Each assembly 11, 13 can also include an alignment layer operable to align the liquid crystal cell to the electrode layer. In a particular embodiment, each alignment layer may comprise, for example, polyimide.

Device 10 includes a controller 22 operable to generate control voltage 18 based, at least in part, on a feedback signal 24. In this particular example, feedback signal 24 comprises a signal containing information about the temperature of liquid crystal material 20. In this example, controller 22 includes or has access to a memory 26. Memory 26 comprises any suitable volatile or non-volatile memory device (e.g., RAM, ROM, EEPROM, flash memory, etc.). Memory 26 may store, for example, a table 28 facilitating cross-reference of temperature information for liquid crystal material 20 with the appropriate magnitude of control signal 18 to maintain and/or affect an operational characteristic of modulator 12. The operational characteristic of modulator 12 stored in memory 26 may comprise, for example, a desired attenuation of output signal 16, or any other operational characteristic. Controller 22 could comprise any hardware, firmware, software or combination thereof.

Table 28 could comprise any data structure, compilation, or other arrangement of information. As one particular example, table 28 could comprise information describing the relationship between an attenuation facilitated by modulator 12 and the voltage necessary to achieve that attenuation for various temperature levels. Although this example uses attenuation as the operational characteristic, other operational characteristics of modulator 12 can be used without departing from the scope of the present disclosure. For example, table 28 could comprise information describing the relationship between a particular polarization state for an optical signal and the voltage necessary to achieve that polarization state for various temperature levels. In an alternative embodiment, controller 22 could include, have access to, or receive a signal from an application operable to receive feedback signal 24 and to apply that information to an algorithm that determines control signal 18. Table/application 28 could comprise any hardware, firmware, software or combination thereof.

In operation, device 10 receives input signal 14 and passes that signal through liquid crystal material 20. Depending at least in part on the control voltage 18 applied to liquid crystal material 20, various characteristics, such as the polarization of input signal 14, can be selectively altered to result in output signal 16. In a particular aspect of operation, device 10 maintains an operational characteristic of output signal 16 by monitoring the temperature of liquid crystal material 20. For example, device 10 may maintain a desired attenuation level of output signal 16.

Controller 22 receives signal 24 including information regarding the temperature of liquid crystal material 20, and determines the appropriate magnitude for control signal 18, based at least in part on temperature information communicated by feedback signal 24 and the desired operational characteristic to be maintained for device 10. In a particular embodiment, controller 22 consults a lookup table 28 where it determines the magnitude of control signal 18 necessary to substantially maintain the operational characteristic of output signal 16 based upon the temperature of material 20 indicated by signal 24.

Although this particular example of device 10 is described with respect to a polarization modulator 12, the invention applies equally to any liquid crystal based device operable to change a characteristic of an incoming optical signal by applying a control voltage to the liquid crystal material.

Figure 2:
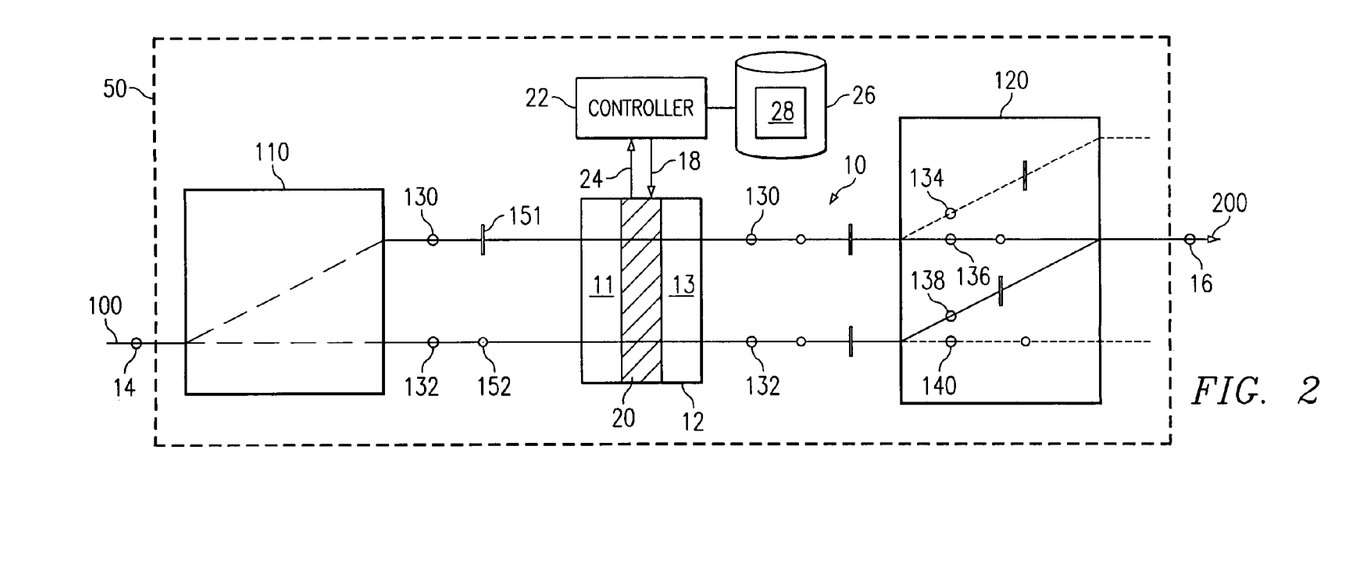
FIG. 2 is a block diagram of one example of an optical processing device implementing a temperature feedback controlled liquid crystal switching device constructed according to the teachings of the present invention.

FIG. 2 is a block diagram of one example of an optical processing system 50 implementing temperature feedback controlled liquid crystal switching device 10. In this particular example, system 50 comprises a dynamic variable attenuator. The invention could similarly apply to, for example, an optical switch. In the illustrated example, optical signal 14 is input at port 100. The input optical signal 14 is spatially separated by a first beam displacer 110 into two approximately orthogonally-polarized beams 130 and 132. As a particular example, first beam displacer 110 could comprise a birefringent element operable to redirect orthogonal portions of signal 14 using the birefringent walk-off effect. Examples of materials suitable for birefringent element in this particular example include calcite, rutile, lithium niobate, yttrium, orthovandate-based crystals, and the like. Although birefringent crystals are used in this particular example, similar functionality can be achieved through use of a polarization beam splitter.

In FIG. 2, the horizontally-polarized beam 130 is indicated by a short line 151 and the vertically-polarized beam 132 is indicated by a filled circle 152. A liquid crystal polarization modulator 12 intercepts both orthogonally-polarized beams 130 and 132. The amount of polarization rotation by modulator 12 upon the orthogonally polarized beams 130 and 132 is dependent upon the voltage 18 applied by controller 22. At the exit plane of modulator 12, the two beams 130 and 132 may each carry a mixture of horizontal and vertical polarizations. Both beams 130 and 132 then enter a second beam displacer 120, which spatially separates the two sets of orthogonal polarizations carried by the two beams 130 and 132 into four beams 134, 136, 138, and 140 Beam 134 comprises the horizontally-polarized component of beam 130. Beam 136 comprises the vertically-polarized component of beam 130. Beam 138 comprises the horizontally-polarized component of beam 132. Beam 140 comprises the vertically-polarized component of beam 132. In this particular example, second beam displacer 120 comprises a second birefringent element, with a thickness chosen to be essentially the same as the first birefringent element 110.

Using this example configuration, the horizontally-polarized component of beam 132, that is, beam 138, is combined with the vertically-polarized component of beam 130, that is, beam 136, when they exit the second birefringent element 120 at output port 200. The combination of beams 136 and 138 therefore form output optical signal 16. In contrast, the vertically-polarized component of beam 132, that is, beam 140, and the horizontally-polarized component of beam 130, that is, beam 134, are routed away from the output port 200. Other configurations are possible using, for example, different birefringent material types and dimensions, or using other beam displacing elements, such as polarization beam splitters.

In the embodiment illustrated in FIG. 2, the attenuator 50 is "off" when control voltage 18 applied to the liquid crystal material 20 is zero. In the "off" state, the liquid crystal polarization modulator 12 rotates the polarization of both beams by approximately ninety (90) degrees, which results in little or no attenuation of the optical signal passing through the attenuator 50. Further, attenuator 50 is "on" when control voltage 18 applied to the liquid crystal material 20 is greater than zero. In the "on" state, liquid crystal polarization modulator 12 rotates the polarization of both beams to achieve mixed polarization. The degree to which the polarization of beams 130 and 132 is changed depends at least in part upon the voltage applied to liquid crystal material 20. By dynamically varying the voltage applied to material 20, attenuator 50 can achieve any suitable level of attenuation of signal 14.

As control voltage 18 increases from zero, the polarization of beams 130 and 132 is adjusted such that an increasing portion of the optical energy in beams 130 and 132 is directed away from the output port 200. Increasing the portion of optical energy directed away from output port 200 facilitates adjustably reducing the amount of optical power coupled into the output port 200 thereby attenuating optical signal 16. As control voltage 18 approaches zero, the polarization of beams 130 and 132 is adjusted such that an increasing portion of the optical energy in beams 130 and 132 is directed to output port 200. Increasing the portion of optical energy directed to output port 200 facilitates adjustably increasing the amount of optical power coupled into output port 200 and thereby decreases the level of attenuation of optical signal 16.

In optical processing systems it may be desirable to maintain the intensity of the output signal within a specified operating range. Where, for example, temperature drift causes an attenuation of the output optical signal to exceed the specified operating range, conventional processing systems might employ a tapping technique to provide control over the attenuation. Conventional systems implementing a tapping technique typically tap the output optical signal and compare that intensity with a reference optical signal. This comparison facilitates generation of a control signal operable to adjust the operation of the modulator to control attenuation. In some cases, tapping the output signal typically leads to increased loss from the output signal.

Unlike conventional systems, system 50 implements a feedback technique that measures the temperature of liquid crystal material 20 within modulator 12. By monitoring the temperature of liquid crystal material 20, controller 22 can regulate control signal 18 to account for temperature variations of liquid crystal material 20 and maintain an operational characteristic of device 10. For example, device 10 may maintain a desired attenuation level of output signal 16 by monitoring the temperature of liquid crystal material 20 and adjusting the magnitude of control signal 18. In this particular embodiment, the magnitude of control signal 18 can be determined, at least in part, with reference to feedback signal 24, which includes information regarding the temperature of liquid crystal material 20.

Controller 22 receives signal 24 including information regarding the temperature of liquid crystal material 20, and determines the appropriate magnitude for control signal 18, based at least in part on temperature information communicated by feedback signal 24 and the desired operational characteristic to be maintained for device 10. In a particular embodiment, controller 22 consults a lookup table 28 where it determines the magnitude of control signal 18 necessary to substantially maintain the operational characteristic of output signal 16 based upon the temperature of material 20 indicated by signal 24.

This aspect of the invention provides an advantage in facilitating control and/or regulation of output signal 16 without requiring tapping into output signal 16 and comparing it to a reference signal. This, in turn, reduces or eliminates the need for additional circuitry or logic to perform a signal tapping and/or comparison function, and avoids signal losses that could otherwise be associated with tapping a portion of output signal 16.

In telecommunications applications operating at wavelengths from approximately 1490 to 1610 nanometers, switching speed has conventionally been a primary design consideration for optical switching devices. Those and other similar devices are beginning to be used and will continue to be developed for use in a bandwidth including at least 1310 to 1610 nanometers. The speed of conventional liquid crystal based optical switching devices is largely determined by the birefringence ($\Delta n$) of the liquid crystal material used in the liquid crystal polarization modulators. For example, for polarizaton modulators implementing liquid crystal modulators, the product of $\Delta n$ (the birefringence) and d (the cell gap) should be greater than or equal to the product of $0.866*\lambda$, where $\lambda$ is the wavelength of the signal being acted upon. The smaller the value of $\Delta n$, the larger the required cell gap to meet this equation. Larger cell gaps mean more liquid crystal material, which can often lead to slower switching times.

Blinded by the search for liquid crystal materials having high switching speeds, most designers have in the past ignored liquid crystal devices with birefringence less than approximately 0.17, thinking those materials are too slow for many switching applications, including applications in telecommunications devices.

One aspect of some embodiments of the present invention identifies an appropriate balance between switching speed, temperature insensitivity, and granularity of control for liquid crystal based optical switching devices. Although this balance can benefit any liquid crystal based switching device, it is particularly advantageous when used with temperature sensing feedback systems.

Figure 3:
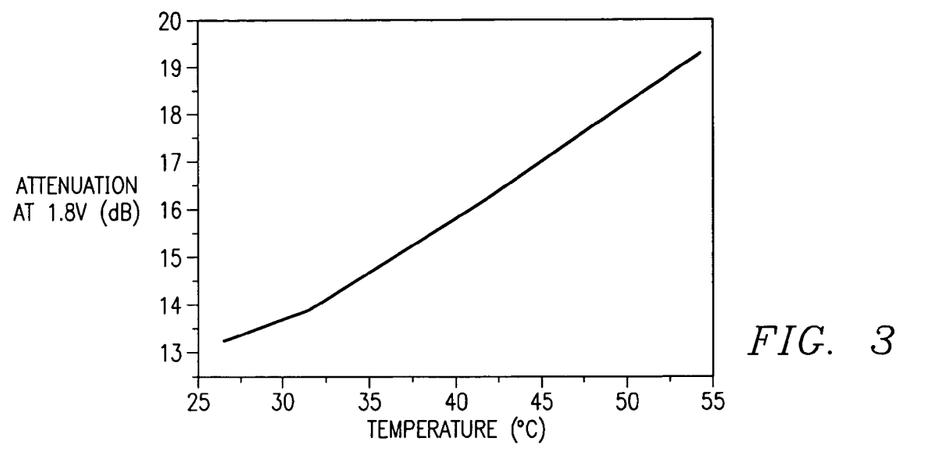
FIG. 3 is a graph showing one measure of the temperature dependence of a material known as E-44 as a function of attenuation constructed according to the teachings of the present invention.

Conventional liquid crystal optical switching devices have used a material commonly known as E-44. This material has been seen as desirable because it has a relatively high birefringence (Δn=0.26), which leads to relatively good response times. This material, however, has a fairly large temperature dependence, causing large changes in attenuation with only small changes in operating temperature. FIG. 3 is a graph showing the temperature dependence of E-44 as a function of attenuation.

As shown in FIG. 3, E-44 exhibits a 0.22 dB change in attenuation for each degree Celsius change in temperature. In general, the temperature dependence of this material is disadvantageous because it cannot be relied on to give consistent attenuation as the operating temperature of the device changes. Indeed, the strong temperature dependence of this material commonly used in liquid crystal switching devices has undoubtedly been one reason that a temperature based feedback for attenuation control is not known to have been contemplated by those of ordinary skill in this art. Attempting to control attenuation based on the operating temperature of E-44 would be extremely difficult because of the large swings in attenuation for small changes in temperature. This characteristic would result in very poor granularity of control in the feedback mechanism.

One aspect of some embodiments of this invention identifies material characteristics that will result in a liquid crystal material suitable for use in a temperature sensitive feedback application, and also suitable for use in a general switching application. One characteristic such a device should have is relative temperature insensitivity, which can be characterized by a small rate of change in birefringence per rate of change of temperature (dΔn/dTemp).

Two factors can help a material have a small dΔn/dTemp. First, a relatively large phase range compared to the operating range of the device. A large phase range compared to the operating range of the device will generally result in better temperature independence because the wider the range of temperatures, the flatter the overall slope of dΔn/dTemp. A liquid crystal material's phase range is defined as the difference between: (i) the temperature ($T_{KN}$) at which the material changes phase from a solid crystal to a nematic liquid; and (ii) the temperature ($T_{NI}$) at which the material changes phase from a nematic liquid to an isotropic liquid.

The E-44 material has a phase range of −10 degrees Celsius to 100 degrees Celsius. The operating range in telecommunication applications is defined by standards to be between −5 degrees Celsius and 70 degrees Celsius. The E-44 material does not have a large phase range compared to the operating range of telecommunication devices. In particular, the lower end of the phase range for the E-44 material is very close (within 5 degrees Celsius) of the operating range for telecommunications devices.

One aspect of this invention recognizes that materials with a phase range of at least 120 degrees Celsius and extending at least ten degrees Celsius on each side of the telecommunication operating range (e.g., −5 degrees Celsius to 70 degrees Celsius) would be better suited for these applications. Materials with a phase range of, for example, −20 to 120 degrees Celsius will in most all cases provide satisfactory results. In addition, for at least some applications, materials with a phase range of −20 to 100 degrees Celsius provide improved temperature insensitivity over conventionally used liquid crystal materials.

Another characteristic helpful in ensuring temperature insensitivity is a low birefringence (Δn). The lower the birefringence of a material, the smaller the range the material has to change between the highest value of Δn and zero. Of course, materials with low Δn have conventionally been largely ignored by designers of telecommunications switching devices, as those materials are seen as being too slow.

For example, the E-44 material has a high birefringence of 0.26. One aspect of some embodiments of this invention recognizes that materials with birefringence of, for example, below 0.17 would be better suited for temperature insensitive applications. Of course, any reduction in birefringence helps desensitize the material to temperature fluctuations.

In addition to providing a temperature insensitive material, this aspect of the invention also strives to maximize switching speed. Materials suitable for these applications ideally would be capable of switching speeds better than 50 milliseconds. Of course, desiring a material with a small birefringence makes a low switching speed difficult to obtain.

One example of a material with a low optical birefringence and good temperature insensitivity is MLC-6647, manufactured by MERCK CORPORATION, and ostensibly designed for use in optical displays. This material has a birefringence of approximately 0.15. Conventional telecommunications switching applications have not implemented this material, likely because the low birefringence might initially suggest insufficient switching speeds, teaching away from use in telecommunications applications. However, this material has good viscosity, which facilitates reasonable switching speeds, despite the low birefringence.

Figure 4:
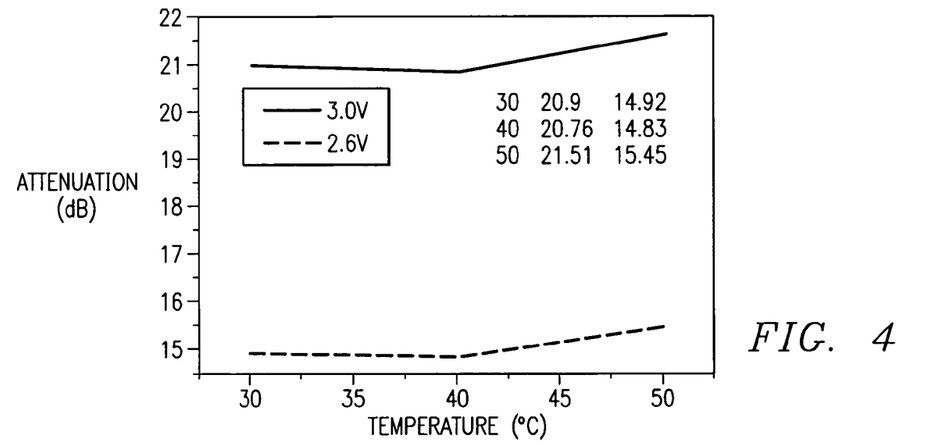
FIG. 4 is a graph showing one measure of the temperature dependence of a material known as MLC-6647 as a function of attenuation constructed according to the teachings of the present invention.

Compared to the E-44 material, the MLC-6647 material has excellent temperature insensitivity. FIG. 4 is a graph showing temperature dependence of MLC-6647 as a function of attenuation. As shown in FIG. 4, MLC-6647 exhibits only a 0.03 decibel change in attenuation for each degree Celsius change in temperature, an over seven hundred percent improvement over the E-44 material. The MLC-6647 material has a phase range ranging from less than −40 degrees Celsius to 133.5 degrees Celsius, much improved over the E-44 material.

Another example of a material with a low optical birefringence and good temperature insensitivity is ZOC-9011-100LA, manufactured by CHISSO CORPORATION. This material has a birefringence of approximately 0.16 and a good viscosity, which facilitates reasonable switching speeds, despite the low birefringence.

Figure 5:
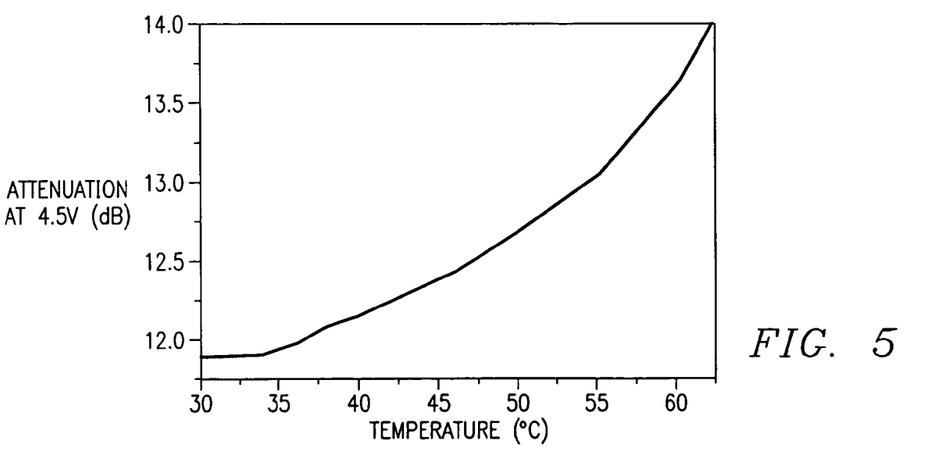
FIG. 5 is a graph showing one measure of the temperature dependence of a material known as ZOC-9011-100LA as a function of attenuation constructed according to the teachings of the present invention.

Compared to the E-44 material, the ZOC-9011-100LA material has excellent temperature insensitivity. FIG. 5 is a graph showing temperature dependence of ZOC-9011-100LA as a function of attenuation. As shown in FIG. 5, ZOC-9011-100LA exhibits only a 0.066 decibel change in attenuation for each degree Celsius change in temperature, an over three hundred percent improvement over the E-44 material. The ZOC-9011-100LA material has a phase range ranging from less than −30 degrees Celsius to 116 degrees Celsius, much improved over the E-44 material.

Another example of a material with a relatively low optical birefringence and good temperature insensitivity is MLC-6621, manufactured by MERCK CORPORATION. This material has a birefringence of approximately 0.21 and a low viscosity, which facilitates reasonable switching speeds.

Figure 6:
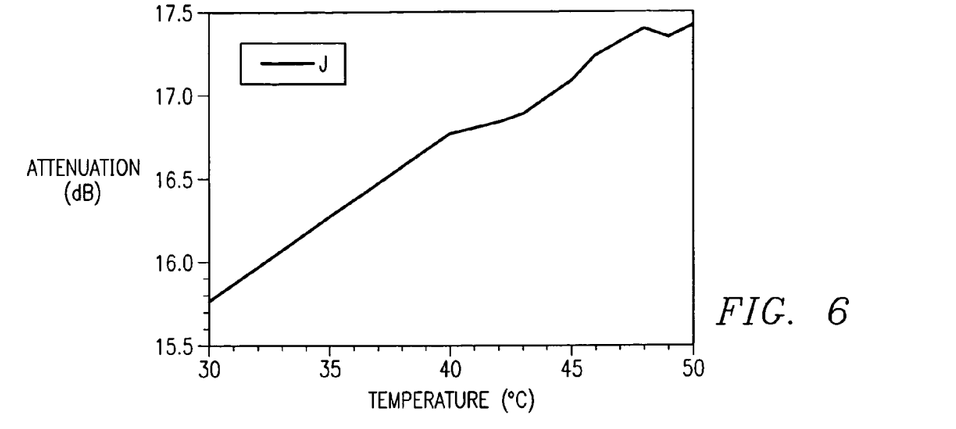
FIG. 6 is a graph showing one measure of the temperature dependence of a material known as MLC-6621-100 as a function of attenuation constructed according to the teachings of the present invention.

Compared to the E-44 material, the MLC-6621 material has excellent temperature insensitivity. FIG. 6 is a graph showing temperature dependence of MLC-6621 as a function of attenuation. As shown in FIG. 6, MLC-6621 exhibits only a 0.084 decibel change in attenuation for each degree Celsius change in temperature, an over two hundred fifty percent improvement over the E-44 material. The MLC-6621 material has a phase range ranging from less than −40 degrees Celsius to 100 degrees Celsius, much improved over the E-44 material.

Figure 7:
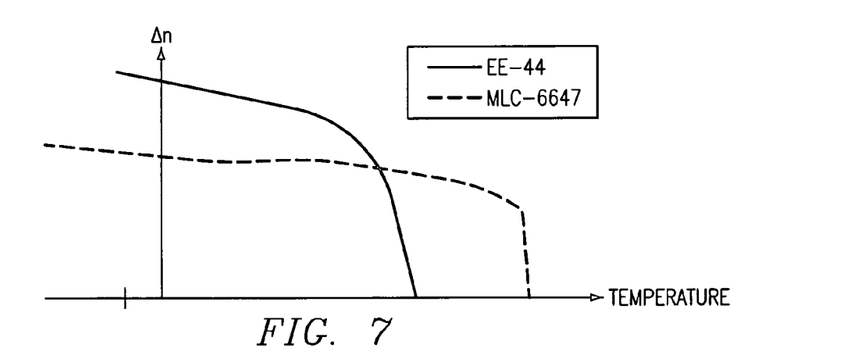
FIG. 7 is a graph showing a comparison of another measure of temperature sensitivities between materials E-44 and MLC-6647.
Figure 8A:
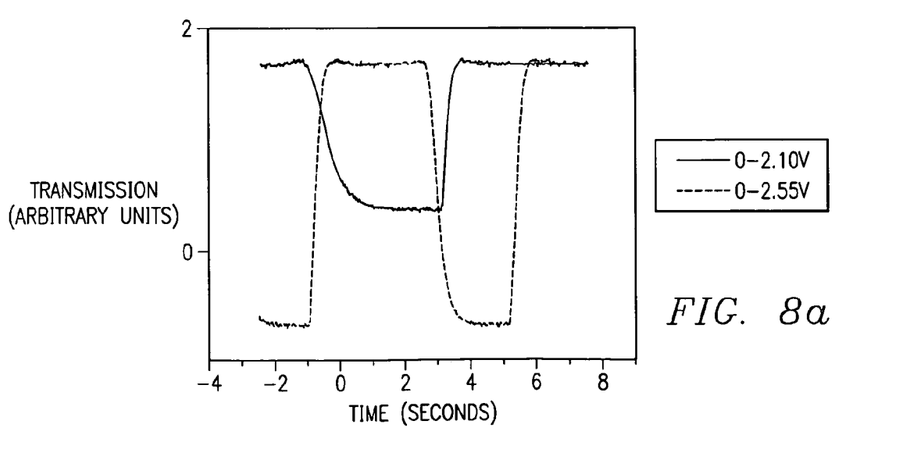
FIGS. 8a–8d are charts showing example switching speeds of dynamic variable attenuators using the material MLC 6647 constructed according to the teachings of the present invention.
Figure 8B:
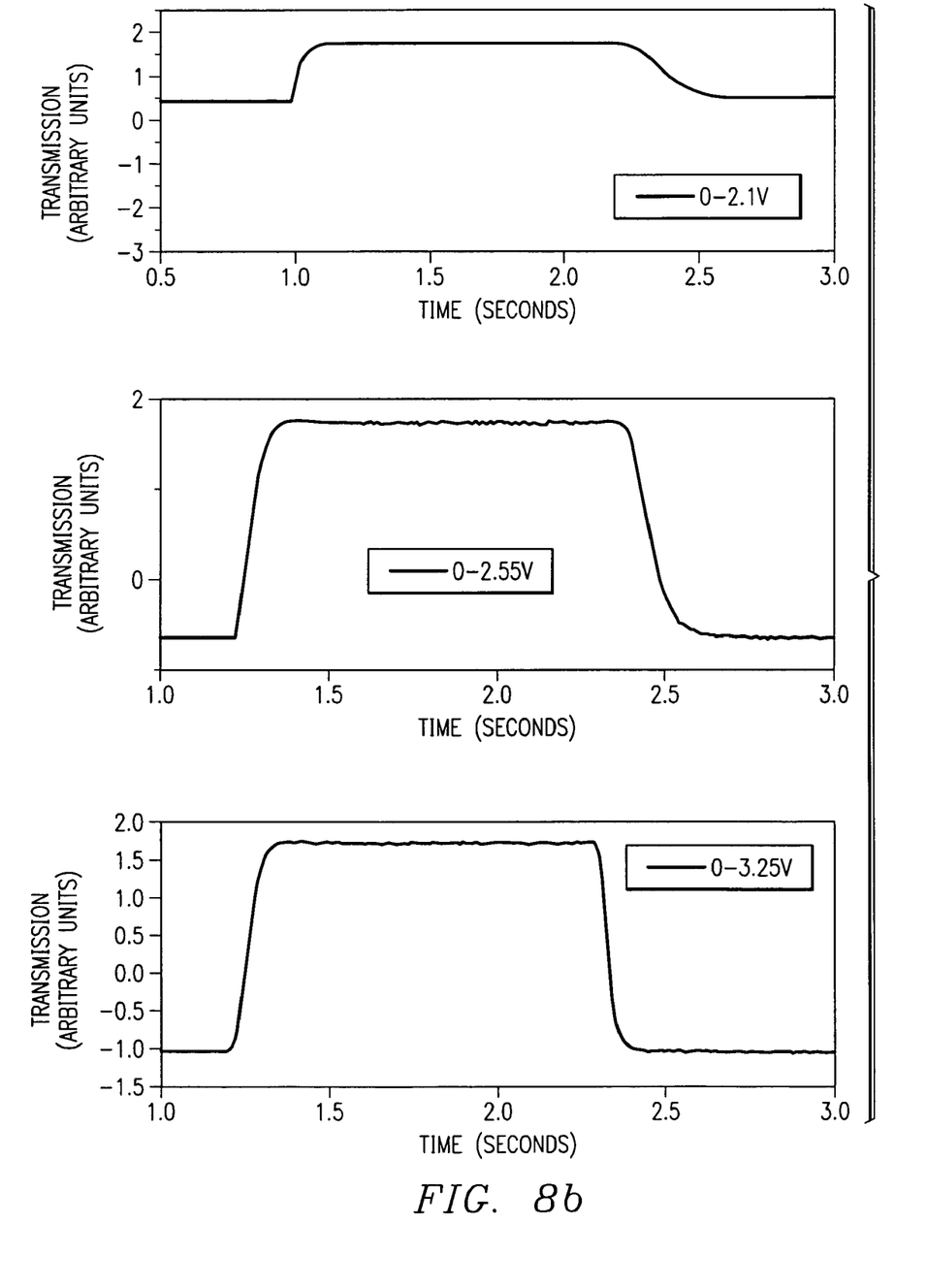
Figure 8C:
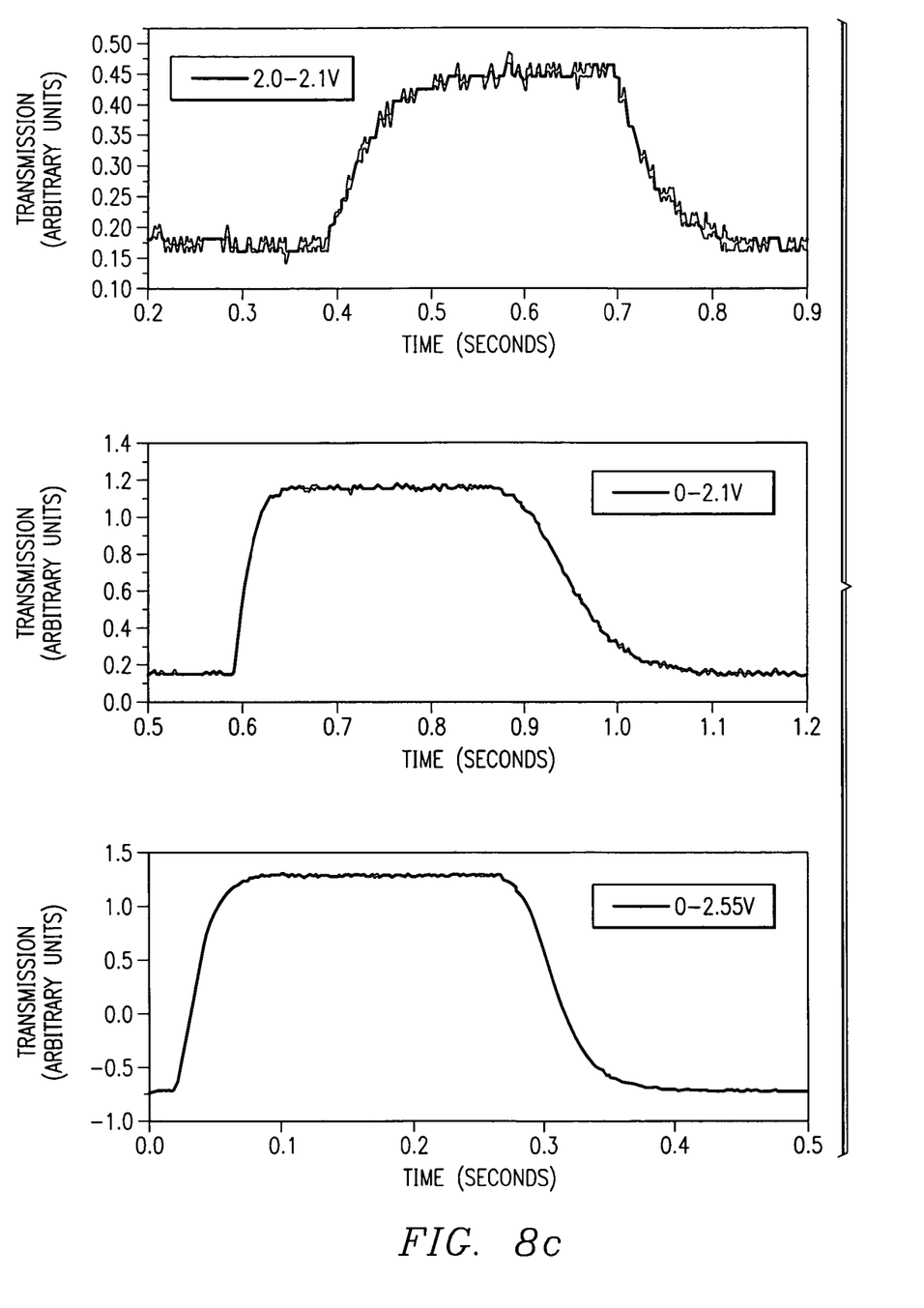
Figure 8D:
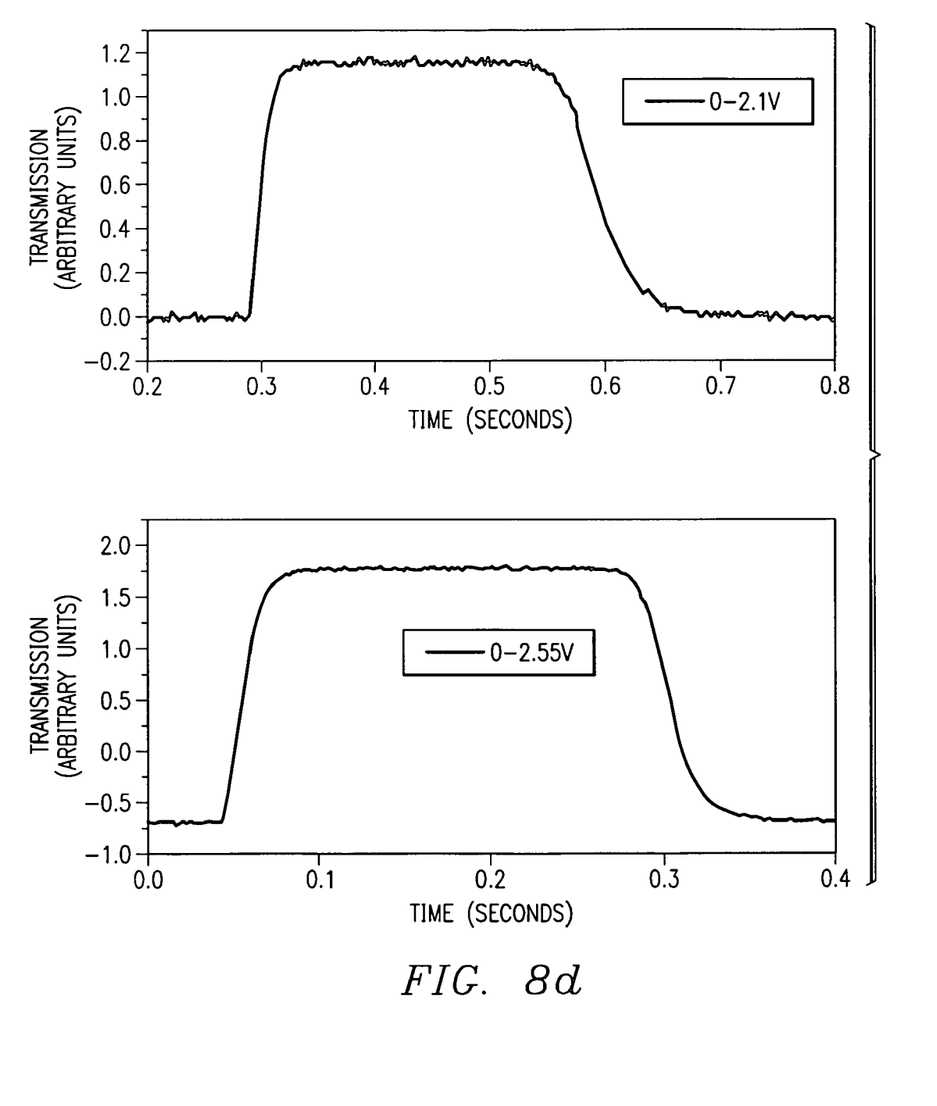

FIG. 7 is a graph roughly illustrating the difference in dΔn/dTemp between the E-44 material and the MLC-6647 material. For simplicity of description the MLC-6647 material is used as a representative material. However, other materials such as ZOC-9011-100LA, MLC-6621-100, and other materials with similar characteristics could be implemented. As shown in this figure, the wider phase range and initially lower value of Δn of the MLC-6647 material result in an overall smaller slope (dΔn/dTemp) of the birefringence/Temperature curve compared to the E-44 material.

FIGS. 8a–8d are charts showing example switching speeds of dynamic variable attenuators using the material MLC-6647.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An optical processing device for use at wavelengths between approximately 1310 and 1610 nanometers, comprising:
   an optical switching element comprising a liquid crystal material comprising:
   a birefringence of 0.21 or less; and
   a phase range of at least 120 degrees Celsius;
   wherein the phase range includes at least a temperature range of −15 degrees Celsius to 80 degrees Celsius.

2. The device of claim 1, wherein the optical switching element is capable of processing wavelengths between approximately 1490 and 1610 nanometers.

3. The device of claim 1, wherein the liquid crystal material comprises:
   a birefringence of 0.17 or less; and
   a phase range of at least −20 to 120 degrees Celsius.

4. The device of claim 1, wherein the optical switching element comprises a polarization modulator operable to effect a change in a polarization state of an input optical signal based at least in part on a control voltage applied to the liquid crystal material.

5. The device of claim 4, wherein the polarization modulator comprises:
   a plurality of electrode layers operable to apply an electric field to the liquid crystal material;
   a plurality of substantially transparent substrates each coupled to at least one of the plurality of electrode layers; and
   a plurality of alignment layers operable to align the liquid crystal material to the electrode layer.

6. The device of claim 1, wherein the device exhibits no more than a 0.2 decibel change in attenuation for each degree of Celsius change in temperature of the liquid crystal material.

7. The device of claim 1, wherein the device exhibits no more than a 0.1 decibel change in attenuation for each degree of Celsius change in temperature of the liquid crystal material.

8. The device of claim 1, wherein the device exhibits no more than a 0.03 decibel change in attenuation for each degree of Celsius change in temperature of the liquid crystal material.

9. The device of claim 1, wherein the liquid crystal material comprises a material selected from the group consisting of MLC-6647, ZOC-9011-100LA, and MLC-6621.

10. The device of claim 1, wherein the device is capable of switching speeds of 50 milliseconds or less.

11. The system of claim 1, further comprising a controller operable to determine a control voltage applied to the liquid crystal material based at least in part on a temperature of the liquid crystal material.

* * * * *